(12) United States Patent　　(10) Patent No.:　US 12,600,649 B2
Ozawa et al.　　(45) Date of Patent:　Apr. 14, 2026

(54) APPARATUS FOR PRODUCING ACIDIC AQUEOUS SOLUTION AND METHOD FOR PRODUCING ACIDIC AQUEOUS SOLUTION

(71) Applicant: DE NORA PERMELEC LTD, Kanagawa (JP)

(72) Inventors: Manabu Ozawa, Tamano (JP); Yoshinori Nishiki, Fujisawa (JP); Masaaki Kato, Tamano (JP); Rie Morita, Tamano (JP)

(73) Assignee: DE NORA PERMELEC LTD (JP)

( * ) Notice: Subject to any disclaimer, the term of this patent is extended or adjusted under 35 U.S.C. 154(b) by 1078 days.

(21) Appl. No.: 17/640,297

(22) PCT Filed: Sep. 4, 2020

(86) PCT No.: PCT/JP2020/033588
§ 371 (c)(1),
(2) Date: Mar. 3, 2022

(87) PCT Pub. No.: WO2021/045191
PCT Pub. Date: Mar. 11, 2021

(65) Prior Publication Data
US 2022/0242757 A1　　Aug. 4, 2022

(30) Foreign Application Priority Data
Sep. 5, 2019　(JP) ................................. 2019-162099

(51) Int. Cl.
*C02F 1/461*　　(2023.01)
*B01D 61/46*　　(2006.01)
(Continued)

(52) U.S. Cl.
CPC .......... *C02F 1/4618* (2013.01); *B01D 61/463* (2022.08); *C02F 1/46109* (2013.01);
(Continued)

(58) Field of Classification Search
CPC .................. C02F 1/4693; C02F 1/4618; C02F 2001/46185; C02F 2001/4619; B01D 61/463
See application file for complete search history.

(56) References Cited

U.S. PATENT DOCUMENTS

| | | | |
|---|---|---|---|
| 5,595,641 A | 1/1997 | Traini et al. | |
| 11,794,147 B2 * | 10/2023 | Matsui ................... | B01D 61/58 |
| 2002/0134687 A1 | 9/2002 | Nakajima et al. | |

FOREIGN PATENT DOCUMENTS

| | | |
|---|---|---|
| JP | H0483890 A | 3/1992 |
| JP | H05214573 A | 8/1993 |

(Continued)

OTHER PUBLICATIONS

Translation of JP 3137831 B2 (Year: 2001).*
PCT/JP2020/033588 International Search Report dated Nov. 2, 2020, 4 pgs.

*Primary Examiner* — Nicholas A Smith
(74) *Attorney, Agent, or Firm* — Bracewell LLP

(57) ABSTRACT

An apparatus (100) for producing an acidic aqueous solution includes: an electrodialyzer (110) that has a monovalent ion perm-selective ion-exchange membrane and separates wastewater containing chloride ions and alkali metal ions into electrodialysis concentrated water and electrodialysis diluted water by an electrodialysis treatment; an electrolyzer (120) includes an anode that that electrolyzes the electrodialysis concentrated water to produce an acidic aqueous solution; and a first circulator (13) that circulates at least some of the acidic aqueous solution to the wastewater supplied to the electrodialyzer (110), and that adjusts a pH of the wastewater supplied to the electrodialyzer to 3 to 9.

18 Claims, 8 Drawing Sheets

(51) Int. Cl.

| | | |
|---|---|---|
| *C02F 1/469* | (2023.01) | |
| *C25B 1/26* | (2006.01) | |
| *C25B 1/30* | (2006.01) | |

(52) U.S. Cl.

CPC .............. *C02F 1/4693* (2013.01); *C25B 1/26* (2013.01); *C25B 1/30* (2013.01); *B01D 2311/08* (2013.01); *B01D 2311/18* (2013.01); *B01D 2311/2523* (2022.08); *B01D 2311/2684* (2013.01); *C02F 2001/46142* (2013.01); *C02F 2001/46166* (2013.01); *C02F 2001/46185* (2013.01); *C02F 2201/46185* (2013.01)

(56) References Cited

FOREIGN PATENT DOCUMENTS

| JP | 06269777 | A | * | 9/1994 | |
|----|----------|---|---|--------|--|
| JP | H06269777 | A | | 9/1994 | |
| JP | H081168 | A | | 1/1996 | |
| JP | 3137831 | B2 | * | 2/2001 | |
| JP | 2002285369 | A | | 10/2002 | |
| JP | 2004010904 | A | | 1/2004 | |
| JP | 2004181339 | A | | 7/2004 | |
| JP | 2014014738 | A | | 1/2014 | |
| WO | WO-2008153274 | A1 | * | 12/2008 | ............... A23L 2/70 |

* cited by examiner

APPARATUS FOR PRODUCING ACIDIC AQUEOUS SOLUTION AND METHOD FOR PRODUCING ACIDIC AQUEOUS SOLUTION

CROSS REFERENCE TO RELATED APPLICATIONS

This application claims the benefit of and priority to PCT/JP2020/033588, filed on Sep. 4, 2020, entitled (translation), "APPARATUS FOR PRODUCING ACIDIC AQUEOUS SOLUTION AND METHOD FOR PRODUCING ACIDIC AQUEOUS SOLUTION," which claims the benefit of and priority to Japanese Patent Application No. 2019-162099, filed on Sep. 5, 2019, which is hereby incorporated by reference in their entirety into this application.

BACKGROUND

Field

Embodiments relate to an apparatus for producing an acidic aqueous solution and a method for producing an acidic aqueous solution.

Priority is claimed on Japanese Patent Application No. 2019-162099, filed Sep. 5, 2019, the content of which is incorporated herein by reference.

Background Art

In a wastewater treatment process, it is essential to add an acidic aqueous solution in order to treat wastewater. For example, in order for the wastewater treatment process to function normally, an acidic aqueous solution is added to adjust the pH. In addition, depending on the apparatus, it is necessary to periodically chemically and physically wash the apparatus, and it is necessary to use an acidic aqueous solution at that time. For example, in a chelation treatment, an ion exchange resin and the like, it is necessary to periodically perform washing with an acidic aqueous solution to restore performance.

On the other hand, since the acidic aqueous solution used in the wastewater treatment process needs to be transported from the outside and stored, it causes a large economic burden.

On the other hand, for example, Patent Literature 1 discloses an organic wastewater treatment apparatus including a first softening treatment apparatus that performs a softening treatment on organic wastewater containing salts and organic substances to reduce a calcium concentration, a suspended solid (SS) removal treatment apparatus that performed one or more treatments selected from the group consisting of a biological treatment, a coagulation precipitation treatment, an activated carbon adsorption treatment, a sand filtration treatment, a microfiltration membrane treatment or a combination of two or more thereof, a salt removal apparatus including any apparatus among an electrodialysis treatment apparatus that performs separation into electrodialysis concentrated water and electrodialysis treated water by an electrodialysis treatment, a reverse osmosis membrane treatment apparatus that performs separation into reverse osmosis concentrated water and reverse osmosis membrane treated water by a reverse osmosis membrane treatment, an NF membrane treatment apparatus that performs separation into NF membrane concentrated water and NF membrane treated water by a nanofiltration (NF) membrane treatment or two or more of these apparatuses, a second softening treatment apparatus that performs a softening treatment on the electrodialysis concentrated water, reverse osmosis concentrated water or NF membrane concentrated water to reduce a calcium concentration, and an electrolysis treatment apparatus that electrolyzes second softening treated water obtained in the second softening treatment apparatus to produce a sodium hypochlorite solution.

In addition, Patent Literature 2 discloses a method for treating wastewater containing a neutral salt of monovalent ions, including supplying wastewater to be treated to a diluting solution chamber of a pre-electrodialysis tank, supplying a concentrate containing a salt produced by neutralizing ions that have passed through an ion-exchange membrane in the pre-electrodialysis tank to an electrolytic dialysis tank composed of three chambers: a positive electrode chamber, a central chamber, and a negative electrode chamber, as units, which have a cation-exchange membrane and an anion-exchange membrane as diaphragms, and performing decomposition into an acid and a base that constitute a salt and performing collection, and a treatment apparatus to which the treatment method is applied.

CITATION LIST

Patent Literature

[Patent Literature 1] Japanese Unexamined Patent Application, First Publication No. 2014-14738
[Patent Literature 2] Japanese Unexamined Patent Application, First Publication No. H08-001168

SUMMARY

Incidentally, in a wastewater treatment, if the acidic aqueous solution used in the wastewater treatment process can be produced and used on-site, and it is not necessary to transport the acidic aqueous solution from the outside and store it, it is thought that it would be possible to significantly reduce the economic burden.

Some embodiments of the present invention have been made in view of the above circumstances, and objects thereof are to provide an apparatus for producing an acidic aqueous solution and a method for producing an acidic aqueous solution through which it is possible to produce and use an acidic aqueous solution used in a wastewater treatment process on-site, and it is possible to significantly reduce the economic burden.

To solve the above-described problem, some embodiments of the present invention use the following structure.

(1) That is, a first embodiments of the present invention is an apparatus for producing an acidic aqueous solution, including: an electrodialyzer that has a monovalent ion perm-selective ion-exchange membrane and separates wastewater containing chloride ions and alkali metal ions into electrodialysis concentrated water and electrodialysis diluted water by an electrodialysis treatment; an electrolyzer that includes an anode that electrolyzes the electrodialysis concentrated water to produce an acidic aqueous solution; and a first circulator that circulates at least some of the acidic aqueous solution to the wastewater supplied to the electrodialyzer, and that adjusts a pH of the wastewater supplied to the electrodialyzer to 3 to 9.

(2) In the apparatus for producing an acidic aqueous solution according to the first embodiment of the present invention, the apparatus may further include a second circulator that circulates at least some of the acidic aqueous solution to the electrolyzer.

(3) In the apparatus for producing an acidic aqueous solution according to the first embodiment of the present invention, in the electrolyzer, an anode may be a hydrogen gas diffusion electrode.

(4) In the apparatus for producing an acidic aqueous solution according to the first embodiment of the present invention, the apparatus may further include a sodium hypochlorite producing device that electrolyzes a part of the electrodialysis concentrated water to produce a sodium hypochlorite aqueous solution.

(5) In the apparatus for producing an acidic aqueous solution according to the first embodiment of the present invention, the apparatus may further include a hydrogen peroxide producing device that electrolyzes a part of the electrodialysis concentrated water to produce hydrogen peroxide.

(6) In the apparatus for producing an acidic aqueous solution according to the first embodiment of the present invention, the electrodialyzer may perform the electrodialysis treatment on the wastewater in which the concentration of the chloride ions is 0.01 mg/L or more.

(7) In the apparatus for producing an acidic aqueous solution according to the first embodiment of the present invention, the electrodialyzer may perform the electrodialysis treatment on the wastewater in which the concentration of the alkali metal ions is 0.01 mg/L or more.

(8) In the apparatus for producing an acidic aqueous solution according to the first embodiment of the present invention, the anode may include a conductive metal substrate and a catalyst layer.

(9) In the apparatus for producing an acidic aqueous solution according to the first embodiment of the present invention, the thickness of the conductive metal substrate may be 0.05 to 5 mm.

(10) In the apparatus for producing an acidic aqueous solution according to the first embodiment of the present invention, the thickness of the catalyst layer may be 0.1 to 100 μm.

(11) In the apparatus for producing an acidic aqueous solution according to the first embodiment of the present invention, the porosity of the anode may be 10 to 95%.

(12) In the apparatus for producing an acidic aqueous solution according to the first embodiment of the present invention, the anode further may include an underlayer made of a valve metal base alloy containing tantalum and titanium components between the conductive metal substrate and the catalyst layer.

(13) In the apparatus for producing an acidic aqueous solution according to the first embodiment of the present invention, a discharge pipe for the sodium hypochlorite aqueous solution produced by the sodium hypochlorite producing device may be connected to a discharge pipe for the wastewater.

(14) In the apparatus for producing an acidic aqueous solution according to the first embodiment of the present invention, in the electrolyzer, a cathode may be an oxygen gas diffusion electrode.

(15) In the apparatus for producing an acidic aqueous solution according to the first embodiment of the present invention, a discharge pipe for the hydrogen peroxide produced by the hydrogen peroxide producing device may be connected to a discharge pipe for the wastewater.

(16) A second embodiment of the present invention is a method for producing an acidic aqueous solution, including: an electrodialysis process in which wastewater containing chloride ions and alkali metal ions is separated into electrodialysis concentrated water and electrodialysis diluted water by an electrodialysis treatment; an electrolysis process in which the electrodialysis concentrated water is electrolyzed to produce, by an anode comprised in an electrolyzer, an acidic aqueous solution; and a first circulating process in which at least some of the acidic aqueous solution is circulated to the wastewater supplied in the electrodialysis process, and in which a pH of the wastewater supplied to the electrodialysis process is adjusted to 3 to 9.

(17) In the method for producing an acidic aqueous solution according to the second embodiment of the present invention, the method may further include a second circulating process in which at least some of the acidic aqueous solution is used in the electrolysis process.

(18) In the method for producing an acidic aqueous solution according to the second embodiment of the present invention, the electrolysis process may be performed by a hydrogen oxidation reaction.

(19) In the method for producing an acidic aqueous solution according to the second embodiment of the present invention, a sodium hypochlorite producing process in which a part of the electrodialysis concentrated water may be electrolyzed to produce a sodium hypochlorite aqueous solution.

(20) In the method for producing an acidic aqueous solution according to the second embodiment of the present invention, the method may further include hydrogen peroxide producing process in which a part of the electrodialysis concentrated water is electrolyzed to produce hydrogen peroxide.

According to an apparatus for producing an acidic aqueous solution and a method for producing an acidic aqueous solution according to one embodiment of the present invention, it is possible to produce and use an acidic aqueous solution used in a wastewater treatment process on-site, and it is possible to significantly reduce the economic burden.

DETAIL DESCRIPTION

Overview

Figure 1:
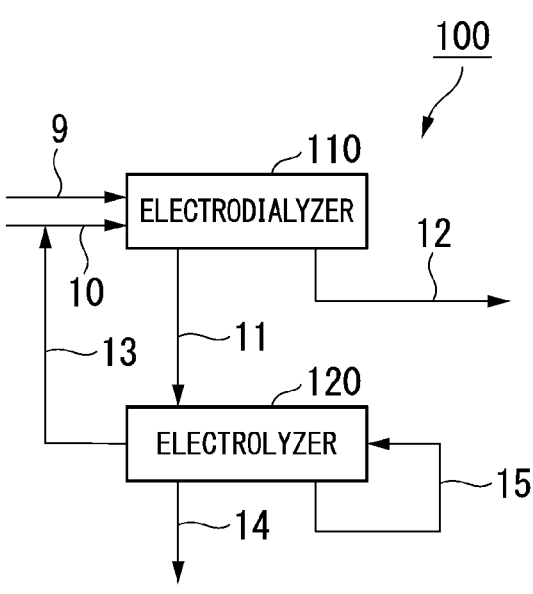
FIG. 1 is a schematic view of an apparatus for producing an acidic aqueous solution 100 according to a first embodiment.

In recent years, with the increase in population and improvement of living conditions, the amount of clean water used has increased, and water resources have become insufficient. In addition, deterioration of the water quality of rivers and wastewater has progressed, and countermeasures therefor are urgently needed worldwide.

For example, projects to use recycled water are being considered for the purpose of sustainable use of water resources.

Wastewater treatments are generally divided into a primary treatment, a secondary treatment, and a tertiary treatment.

In the primary treatment, large waste particles (SS: suspended solids) are removed. SS is specifically the solids in sewage mixed with human waste.

In the secondary treatment, organic substances in the sewage that could not be removed in the primary treatment are removed according to the action of microorganisms. Specifically, in the secondary treatment, a simple aeration treatment, an activated sludge treatment, a methane fermentation treatment or the like is performed.

In the tertiary treatment (also referred to as an advanced treatment or a post-treatment), nitrogen, phosphorus, difficult-to-decompose substances and the like are removed by a chemical, physical, or a biological method.

Examples of chemical treatments include separation of contaminants using a coagulant or the like, and decomposition of contaminants using an oxidant such as ozone.

The physical treatment includes adsorption by activated carbon and separation by a membrane treatment.

For membranes used for separation by a membrane treatment, a reverse osmosis membrane (that is, a reverse osmosis (RO) membrane), an ultrafiltration membrane (that is, an ultrafiltration (UF) membrane), a microfiltration membrane (that is, a microfiltration (MF) membrane) and the like are used.

In the wastewater treatment process, in order to treat wastewater, it is essential to add an acidic aqueous solution. For example, in order for the wastewater treatment process to function normally, an acidic aqueous solution is added to adjust the pH. In addition, depending on the apparatus, it is necessary to periodically chemically and physically wash the apparatus, and it is necessary to use an acidic aqueous solution at that time. For example, in a chelation treatment, use of an ion exchange resin and the like, it is necessary to periodically perform washing with an acidic aqueous solution to restore performance.

On the other hand, since the acidic aqueous solution used in the wastewater treatment process needs to be transported from the outside and stored, it causes a large economic burden.

In the conventional organic wastewater treatment apparatus described in Patent Literature 1 described above, it is possible to produce sodium hypochlorite, but it is not possible to produce an acidic aqueous solution used in the wastewater treatment process on-site.

In addition, in the wastewater treatment apparatus described in Patent Literature 2, a problem of an acidic aqueous solution that needs to be transported from the outside can be addressed, but a problem of the produced acidic aqueous solution that needs to be stored cannot be addressed. Therefore, in the conventional treatment method, the acidic aqueous solution used in the wastewater treatment process could not be produced and used on-site.

An apparatus for producing an acidic aqueous solution according to a first embodiment is an apparatus for producing an acidic aqueous solution that produces an acidic aqueous solution from wastewater containing chloride ions and alkali metal ions (hereinafter simply referred to as wastewater), including an electrodialyzer that has a monovalent ion perm-selective ion-exchange membrane and separates the wastewater into electrodialysis concentrated water and electrodialysis diluted water by an electrodialysis treatment, an electrolyzer that electrolyzes the electrodialysis concentrated water to produce an acidic aqueous solution, and a first circulator that circulates at least some of the acidic aqueous solution to the wastewater supplied to the electrodialyzer. Thereby, it is possible to achieve a complete type (zero chemical charge (ZCC)) in which the acidic aqueous solution used in the wastewater treatment process is locally produced and locally consumed on-site, and it is possible to significantly reduce the economic burden.

(Apparatus for Producing Acidic Aqueous Solution)

A first embodiment of the present invention is an apparatus for producing an acidic aqueous solution that produces an acidic aqueous solution from wastewater containing chloride ions and alkali metal ions, including an electrodialyzer that has a monovalent ion perm-selective ion-exchange membrane and separates the wastewater into electrodialysis concentrated water and electrodialysis diluted water by an electrodialysis treatment, an electrolyzer that electrolyzes the electrodialysis concentrated water to produce an acidic aqueous solution, and a first circulator that circulates at least some of the acidic aqueous solution to the wastewater supplied to the electrodialyzer.

<Apparatus for Producing Acidic Aqueous Solution According to First Embodiment>

An apparatus for producing an acidic aqueous solution according to a first embodiment includes an electrodialyzer, an electrolyzer, and a first circulator.

The apparatus for producing an acidic aqueous solution according to the first embodiment will be described in detail with reference to FIG. 1.

Wastewater

In the apparatus for producing an acidic aqueous solution according to the first embodiment, wastewater (referred to as raw water) includes, for example, organic wastewater which contains at least chloride ions and alkali metal ions, and cannot be reused or discharged into rivers. Specific examples thereof include organic wastewater having a high salt concentration from such as seawater, excreta, and leachates from garbage landfill. These generally contain impurities (hereinafter referred to as various ion components) such as calcium ions, magnesium ions, sodium ions, silica (for example, ionic silica, and colloidal silica), chloride ions, and carbonate ions.

In order to further improve the effects of the first embodiment, the lower limit value of the chloride ion concentration of wastewater is preferably 0.01 mg/L or more. On the other hand, the upper limit value of the chloride ion concentration of wastewater is not particularly limited, and is, for example, 500 mg/L or less.

In addition, the lower limit value of the alkali metal ion concentration of wastewater is preferably 0.01 mg/L or more. On the other hand, the upper limit value of the alkali metal ion concentration of wastewater is not particularly limited, and is, for example, 500 mg/L or less.

Here, in this specification, the cation concentration is a value measured by inductively coupled plasma (ICP) emission spectroscopy. Specifically, it is a value measured using an emission spectrophotometer (ICP-AES; SPS5520, commercially available from Seiko Instruments Inc.) using an argon gas ICP as a light source.

On the other hand, the anion concentration is a value measured using an ion chromatography analyzer (ICA-2000; commercially available from DKK-TOA Corporation).

An apparatus for producing an acidic aqueous solution 100 according to the first embodiment shown in FIG. 1 has the following configuration.

A wastewater inflow pipe 10 through which wastewater is supplied is connected to an electrodialysis dilution chamber of an electrodialyzer 110. In addition, a dialysis water electrodialysis concentration chamber supply pipe 9 through which dialysis water is supplied is connected to an electrodialysis concentration chamber of the electrodialyzer 110. An electrodialysis concentrated water supply pipe 11 and an electrodialysis diluted water discharge pipe 12 are connected to the outlet side of the electrodialyzer 110. The electrodialyzer 110 is connected to an electrolyzer 120 via the electrodialysis concentrated water supply pipe 11. A first circulator 13, an acid water discharge pipe 14, and a second circulator 15 are connected to the outlet side of the electrolyzer 120.

The electrodialyzer 110 is an apparatus that has a monovalent ion perm-selective ion-exchange membrane and separates wastewater containing chloride ions and alkali metal ions into electrodialysis concentrated water and electrodialysis diluted water by an electrodialysis treatment.

Figure 2:
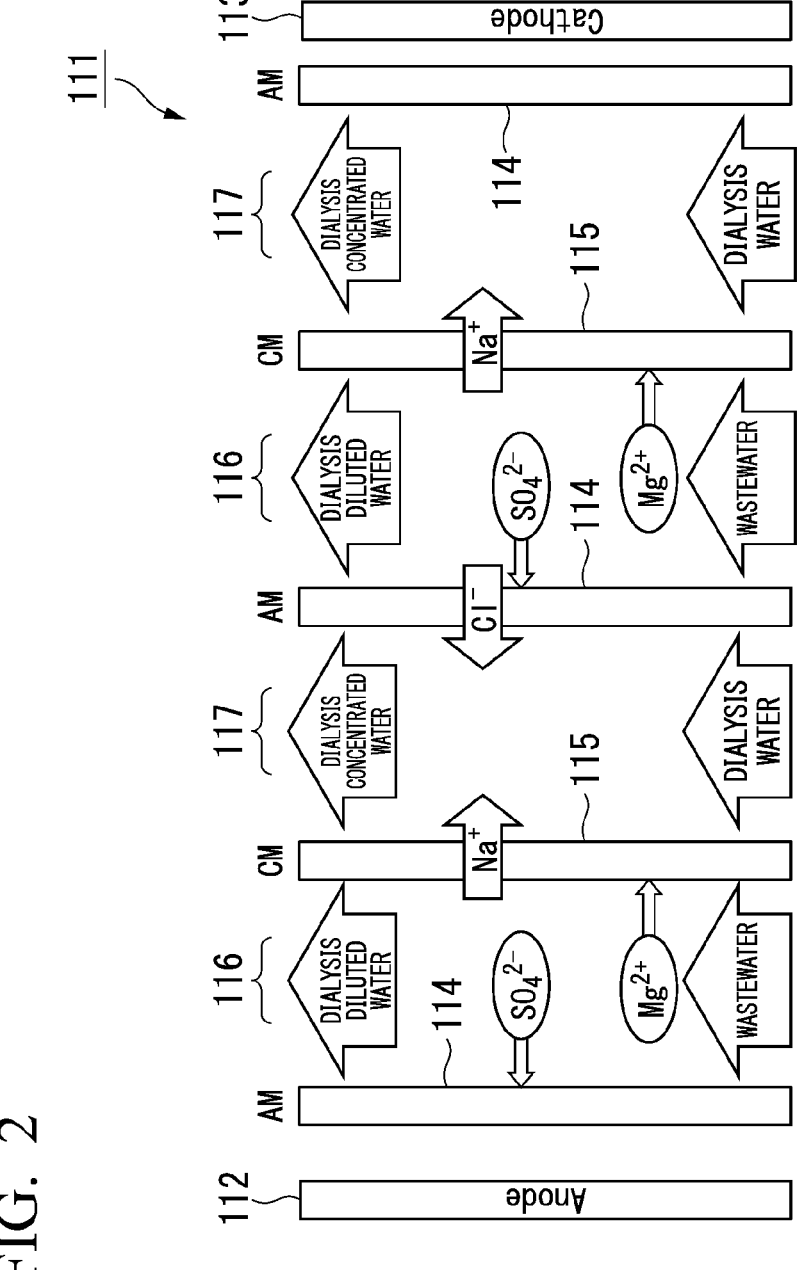
FIG. 2 is a schematic view showing an electrodialyzer 111, which is an example of an electrodialyzer.

Specific examples of the electrodialyzer 110 include an electrodialyzer 111 having a monovalent ion perm-selective ion-exchange membrane shown in FIG. 2.

The electrodialyzer 111 having a monovalent ion perm-selective ion-exchange membrane includes an anode 112 and a cathode 113. In addition, it is divided into an electrodialysis dilution chamber 116 and an electrodialysis concentration chamber 117 by alternately providing a monovalent anion perm-selective ion-exchange membrane 114 and a monovalent cation perm-selective ion-exchange membrane 115 between the anode 112 and the cathode 113.

The wastewater inflow pipe 10 through which wastewater is supplied is connected to the electrodialysis dilution chamber of the electrodialyzer 110. On the other hand, the dialysis water electrodialysis concentration chamber supply pipe 9 through which dialysis water is supplied is connected to the electrodialysis concentration chamber of the electrodialyzer 110. Here, the dialysis water is water containing a small amount of multivalent ions (for example, tap water).

When the dialysis water containing a small amount of multivalent ions is supplied to the electrodialysis concentration chamber of the electrodialyzer, it is possible to improve the efficiency of production of an acidic aqueous solution of an electrolyzer to be described below.

Here, the apparatus for producing an acidic aqueous solution 100 according to the first embodiment includes the dialysis water electrodialysis concentration chamber supply pipe 9. However, depending on the water quality of wastewater, the dialysis water electrodialysis concentration chamber supply pipe 9 may not be provided, and only the wastewater inflow pipe 10 may be connected to the electrodialyzer 110.

That is, wastewater may be supplied to both the electrodialysis concentration chamber and the electrodialysis dilution chamber of the electrodialyzer 110.

Specific examples of the anode 112 include an electrode in which a catalyst layer is formed by firing a catalyst on a conductive metal substrate that is stable to oxidation.

Examples of conductive metals include titanium.

Examples of catalysts include precious metals such as platinum, iridium, ruthenium, and rhodium; valve metals such as titanium and tantalum; and oxides of valve metals.

In the anode 112, the thickness of the conductive metal substrate is preferably 0.05 to 5 mm.

In addition, the thickness of the catalyst layer is preferably 0.1 to 100 μm.

The porosity of the anode 112 is preferably 10 to 95%.

In order to improve adhesion of the catalyst, a roughening treatment is preferably performed on the conductive metal. Examples of roughening treatments include a blasting treatment by spraying powder, etching using a soluble acid, and plasma spraying.

When the anode 112 is produced, before a catalyst layer is formed, it is preferable to form an AIP underlayer made of a valve metal base alloy containing tantalum and a titanium component on the conductive metal substrate by an arc ion plating (AIP) method. When the AIP underlayer is provided on the conductive metal substrate, it is possible to further prevent interfacial corrosion of the metal substrate. In addition, an underlayer composed of a TiTaOx oxide layer may be formed in place of the AIP underlayer.

More specifically, as the anode 112, a Ti mesh electrode formed with a catalyst composed of Pt and Ir oxide or the like can be used.

Like the anode 112, as the cathode 113, an electrode in which a catalyst layer is formed by firing a catalyst on a conductive metal substrate that is stable to oxidation may be exemplified.

Examples of conductive metals include titanium, nickel, iron, stainless steel, and carbon.

Examples of catalysts include precious metals such as platinum, iridium, ruthenium, and rhodium; valve metals such as titanium and tantalum; and oxides of valve metals.

In addition, as the cathode 113, a platinum-plated conductive metal may be used.

Specific examples of the monovalent anion perm-selective ion-exchange membrane 114 include those in which a membrane having a dense structure is formed on the surface of the anion-exchange membrane. The membrane limits movement of multivalent ions by a sieving effect, and thus the transport rate of multivalent ions is reduced.

Specific examples of anion-exchange membranes include an m-phenylenediamine-phenolic condensed resin and a resin obtained by subjecting a styrene-divinylbenzene copolymer to an amination reaction.

As a commercially available example of the monovalent anion perm-selective ion-exchange membrane 114, ACS (commercially available from ASTOM Corporation) or the like can be used.

Specific examples of the monovalent cation perm-selective ion-exchange membrane 115 include those in which a membrane having a dense structure is formed on the surface of the cation-exchange membrane. The membrane limits movement of multivalent ions by a sieving effect, and thus the transport rate of multivalent ions is reduced.

Specific examples of cation-exchange membranes include a m-phenolsulfonic acid-phenolic resin, and a resin obtained by subjecting a styrene-divinylbenzene copolymer to a sulfonation reaction.

In addition, as the monovalent cation perm-selective ion-exchange membrane 115, those in which a cationic polymer electrolyte containing a polyethyleneimine is formed on the surface of the cation exchange membrane may be used. In this case, as the valence of cations is higher, movement of the surface due to a repulsive effect is more constrained, and the monovalent cation selectivity is exhibited.

As a commercially available example of the monovalent cation perm-selective ion-exchange membrane 115, CIMS (commercially available from ASTOM Corporation) or the like can be used.

When the apparatus for producing an acidic aqueous solution 100 includes the electrodialyzer 110 having a monovalent ion perm-selective ion-exchange membrane, it is possible to increase the concentration of monovalent anions (for example, chloride ions) in wastewater. Therefore, in the electrolyzer 120 to be described below, it is possible to produce the acidic aqueous solution more efficiently. In addition, multivalent ions that are likely to adhere to the electrolyzer 120 can be removed in advance.

The electrodialysis diluted water produced by the electrodialyzer 110 is discharged through the electrodialysis diluted water discharge pipe 12.

On the other hand, the electrodialysis concentrated water produced by the electrodialyzer 110 is supplied to the electrolyzer 120 through the electrodialysis concentrated water supply pipe 11.

The electrolyzer 120 is an apparatus that electrolyzes the electrodialysis concentrated water to produce an acidic aqueous solution and an alkaline aqueous solution.

Figure 3:
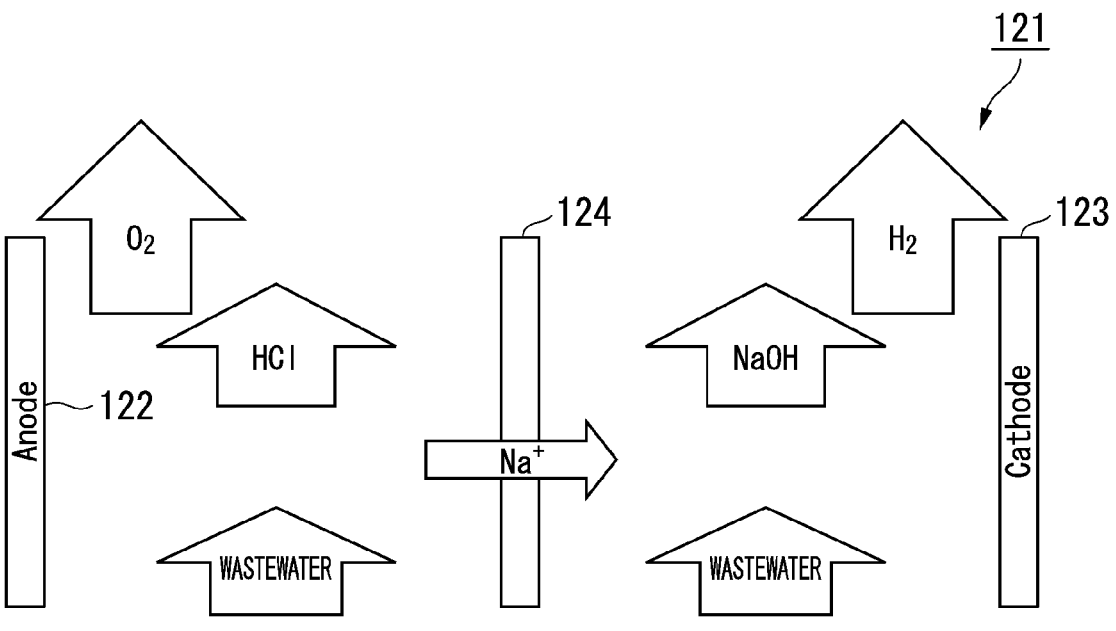
FIG. 3 is a schematic view showing a two-chamber electrolyzer 121, which is an example of an electrolyzer.
Figure 4:
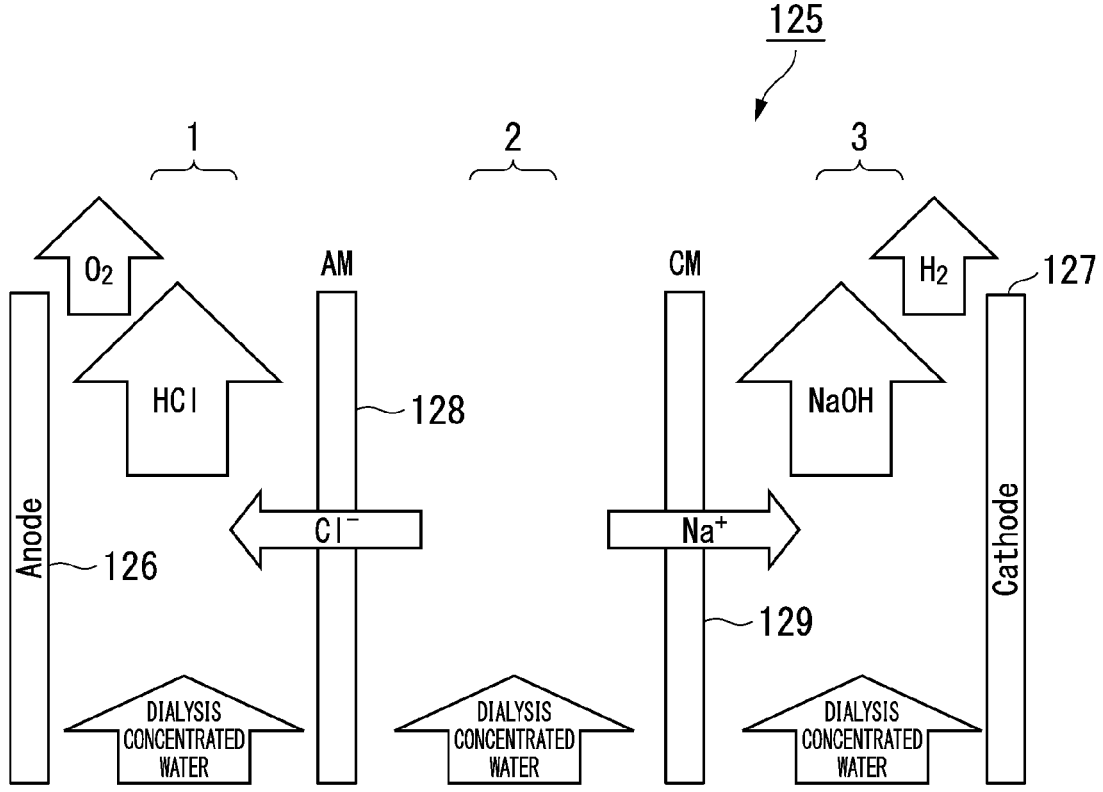
FIG. 4 is a schematic view showing a three-chamber electrolyzer 125, which is an example of an electrolyzer.

Specific examples of the electrolyzer 120 include a two-chamber electrolyzer 121 shown in FIG. 3 and a three-chamber electrolyzer 125 shown in FIG. 4.

The two-chamber electrolyzer 121 shown in FIG. 3 includes an anode 122 and a cathode 123, and is divided into an anode chamber and a cathode chamber by a diaphragm 124.

As the anode 122, the same ones described above as the anode 112 of the electrodialyzer 110 may be exemplified. Among these, a hydrogen gas diffusion electrode is preferably used.

When the hydrogen gas diffusion electrode is used, it is possible to further minimize generation of chlorine.

The hydrogen gas diffusion electrode is a gas electrode composed of catalyst particles that easily oxidize hydrogen and carbon particles that serve carriers for the catalyst particles.

Specific examples of catalyst particles include platinum and ruthenium.

Specific examples of hydrogen gas diffusion electrodes include an electrode including a support and a power feeder.

Examples of supports of hydrogen gas diffusion electrodes include those in which a hydrophobic resin is fixed on a conductive carbon material (for example, a sheet, cloth, and paper) having catalyst particles.

Examples of power feeders include a porous plate such as a metal mesh made of a material that is durable to acidity. The support and the power feeder are bonded by crimping.

As the cathode 123, the same ones described above as the cathode 113 of the electrodialyzer 110 may be exemplified.

Specific examples of the diaphragm 124 include an ion-exchange membrane, a porous resin film and a porous ceramic film. Among these, it is preferable to provide a neutral membrane such as a porous resin film and a porous ceramic film. Examples of commercially available products of porous resin films include Y9201 (commercially available from Yuasa Membrane Systems Co., Ltd.).

The three-chamber electrolyzer 125 shown in FIG. 4 includes an anode 126 and a cathode 127, and is divided into an anode chamber 1, an intermediate chamber 2, and a cathode chamber 3 by an anion-exchange membrane 128 on the side of the anode 126 and a cation-exchange membrane 129 on the side of the cathode 127.

In the three-chamber electrolyzer 125, electrolysis is performed only in the intermediate chamber 2, and ions produced in the intermediate chamber 2 move to the anode chamber 1 and the cathode chamber 3 on both sides.

According to electrolysis from electrodialysis concentrated water, an acidic aqueous solution is produced in the anode chamber 1, and a basic aqueous solution is produced in the cathode chamber 3. Unlike the two-chamber electrolyzer 121, the three-chamber electrolyzer 125 has an advantage that salt water is not mixed with the acidic aqueous solution and the basic aqueous solution.

Here, as the anode 126 and the cathode 127 in the three-chamber electrolyzer 125, the same ones described as the anode 122 and the cathode 123 in the two-chamber electrolyzer 121 may be exemplified.

For example, when wastewater containing sodium ions and chloride ions is electrolyzed using the electrolyzer 120, a reaction represented by the following Formula (1) proceeds, and a sodium hydroxide aqueous solution (that is, an alkaline aqueous solution) and a hydrochloric acid (that is, an acidic aqueous solution) are obtained.

$$NaCl+2H_2O=NaOH+HCl+H_2+\tfrac{1}{2}O_2 \qquad (1)$$

In addition, when the electrolyzer 120 in which the anode is a hydrogen gas diffusion electrode is used, a hydrogen oxidation reaction represented by the following Formula (2) occurs in the anode. In addition, the total reaction is as shown in the following Formula (3).

$$H_2=2H^++2e^- \qquad (2)$$

$$NaCl+H_2O=NaOH+HCl \qquad (3)$$

As the raw hydrogen gas, a high-purity electrolytic hydrogen gas generated in the cathode is used. It is possible to minimize generation of chlorine by keeping a potential lower than a chlorine generation potential.

The acidic aqueous solution (for example, hydrochloric acid) produced in the electrolyzer 120 is circulated to wastewater supplied to the electrodialyzer 110 via the first circulator 13 and the wastewater inflow pipe 10.

The acidic aqueous solution produced in the electrolyzer 120 can be circulated to wastewater to adjust the pH of the wastewater.

For example, the wastewater supplied to the electrodialyzer 110 described above may be treated in advance by a crystallizer that removes calcium carbonate or an alkaline precipitation device that precipitates and removes heavy metals as hydroxides. In this case, since the wastewater is alkaline (a pH of about 11 or more), it is preferable to circulate the acidic aqueous solution produced in the electrolyzer 120 in wastewater to adjust the pH of the wastewater. Specifically, it is preferable to adjust the pH of the wastewater to 10 or less, and it is more preferable to adjust the pH of the wastewater to 3 to 9.

Thereby, it is possible to further prevent deterioration of the monovalent anion perm-selective ion-exchange membrane 114 and the monovalent cation perm-selective ion-exchange membrane 115.

Here, in this specification, the pH of various aqueous solutions is a value obtained by measuring the pH of various aqueous solutions at 25° C. with a pH meter (D74, commercially available from HORIBA, Ltd.).

In addition, the acidic aqueous solution (for example, hydrochloric acid) produced in the electrolyzer 120 is used to wash the inside of the electrolyzer 120 when the electrolyzer 120 is stopped via the second circulator 15. Here, the electrolyzer 120 may include a storage tank in which the acidic aqueous solution is stored.

Here, in the schematic view of the apparatus for producing an acidic aqueous solution according to the first embodiment shown in FIG. 1, the apparatus for producing an acidic aqueous solution 100 includes the second circulator 15. However, the apparatus for producing an acidic aqueous solution 100 may not include the second circulator 15.

In addition, the electrolyzer 120 may be connected to another apparatus in order to use the alkaline aqueous solution produced in the electrolyzer 120. Examples of other apparatuses include a crystallizer that removes calcium carbonate using an alkaline aqueous solution and an alkaline precipitation device that precipitates and removes heavy metals as hydroxides.

The apparatus for producing an acidic aqueous solution 100 according to the first embodiment described above includes the above electrodialyzer 110, the electrolyzer 120, and the first circulator 13. In the apparatus for producing an acidic aqueous solution 100 according to the first embodiment, an acidic aqueous solution required for adjusting the pH of the wastewater and preventing deterioration of the monovalent ion perm-selective ion-exchange membrane of the electrodialyzer can be produced on-site in the electrolyzer 120, and used in the electrodialyzer 110 via the first circulator 13. Therefore, it is not necessary to transport and store the acidic aqueous solution from the outside and it is possible to significantly reduce the economic burden.

<Apparatus for Producing Acidic Aqueous Solution According to Second Embodiment>

An apparatus for producing an acidic aqueous solution according to a second embodiment further includes a sodium hypochlorite producing device in addition to the apparatus for producing an acidic aqueous solution according to the first embodiment. That is, the apparatus for producing an acidic aqueous solution according to the second embodiment includes an electrodialyzer, an electrolyzer, a first circulator, and a sodium hypochlorite producing device.

The apparatus for producing an acidic aqueous solution according to the second embodiment will be described in detail with reference to FIG. 5.

Figure 5:
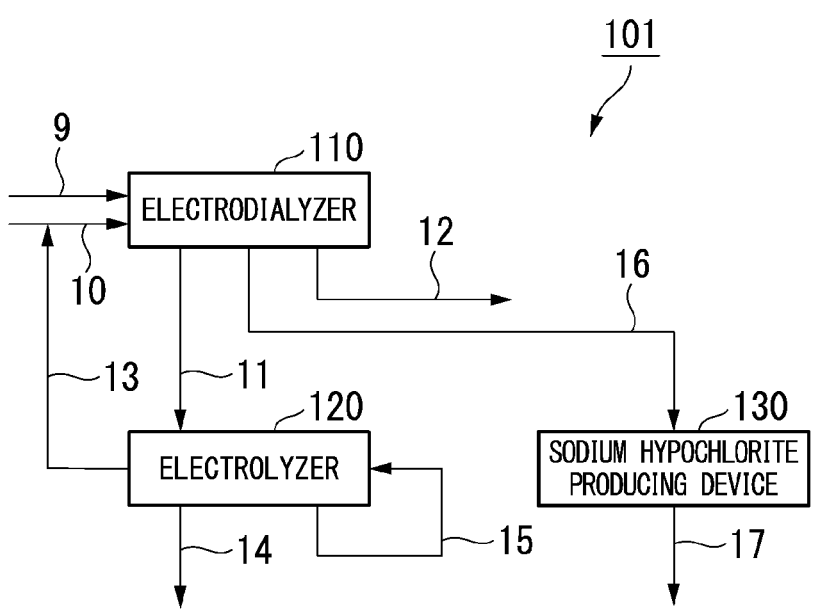
FIG. 5 is a schematic view of an apparatus for producing an acidic aqueous solution 101 according to a second embodiment.

An apparatus for producing an acidic aqueous solution 101 according to the second embodiment shown in FIG. 5 has the following configuration.

The wastewater inflow pipe 10 through which wastewater is supplied is connected to the electrodialysis dilution chamber of the electrodialyzer 110. In addition, the dialysis water electrodialysis concentration chamber supply pipe 9 through which dialysis water is supplied is connected to the electrodialysis concentration chamber of the electrodialyzer 110. The first electrodialysis concentrated water supply pipe 11, the electrodialysis diluted water discharge pipe 12, and a second electrodialysis concentrated water supply pipe 16 are connected to the outlet side of the electrodialyzer 110. The electrodialyzer 110 is connected to the electrolyzer 120 via the electrodialysis concentrated water supply pipe 11. The first circulator 13, the acid water discharge pipe 14, and the second circulator 15 are connected to the outlet side of the electrolyzer 120. In addition, the electrodialyzer 110 is connected to a sodium hypochlorite producing device 130 via the second electrodialysis concentrated water supply pipe 16. A sodium hypochlorite aqueous solution discharge pipe 17 is connected to the outlet side of the sodium hypochlorite producing device 130.

The sodium hypochlorite producing device 130 is an apparatus that electrolyzes a part of the electrodialysis concentrated water to produce sodium hypochlorite.

Figure 6:
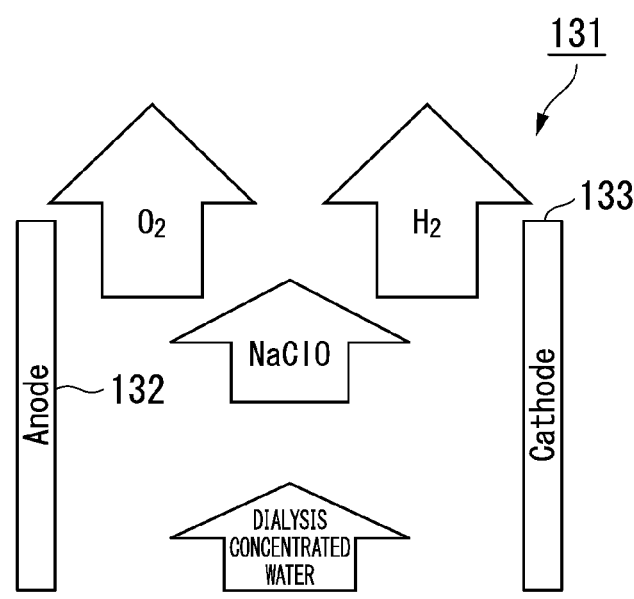
FIG. 6 is a schematic view showing a sodium hypochlorite producing device 131, which is an example of a sodium hypochlorite producing device.

Specific examples of the sodium hypochlorite producing device 130 include a one-chamber electrolyzer 131 shown in FIG. 6. The one-chamber electrolyzer 131 includes an anode 132 and a cathode 133.

Here, as the anode 132 and the cathode 133 in the sodium hypochlorite producing device 131, the same ones described as the anode 122 and the cathode 123 in the two-chamber electrolyzer 121 may be exemplified.

In the sodium hypochlorite producing device 130, a reaction represented by the following Formula (4) occurs, and sodium hypochlorite can be produced from chloride ions contained in wastewater.

$$2Cl^- = Cl_2 + 2e^-$$

$$2NaOH + Cl_2 \rightarrow NaCl + NaClO + H_2O \tag{4}$$

The sodium hypochlorite can be used as, for example, a disinfectant for treated water on which a wastewater treatment is performed. Therefore, if the sodium hypochlorite aqueous solution discharge pipe 17 is connected to a pipe through which wastewater on which a wastewater treatment is performed is discharged, the sodium hypochlorite can be used on-site.

Here, the apparatus for producing an acidic aqueous solution 101 according to the second embodiment includes the dialysis water electrodialysis concentration chamber supply pipe 9. However, depending on the water quality of wastewater, the dialysis water electrodialysis concentration chamber supply pipe 9 may not be provided, and only the wastewater inflow pipe 10 may be connected to the electrodialyzer 110.

That is, wastewater may be supplied to both the electrodialysis concentration chamber and the electrodialysis dilution chamber of the electrodialyzer 110.

In addition, the apparatus for producing an acidic aqueous solution 101 according to the second embodiment includes the second circulator 15 that circulates the acidic aqueous solution (for example, hydrochloric acid) produced in the electrolyzer 120 in order to wash the inside of the electrolyzer 120. However, the apparatus for producing an acidic aqueous solution 101 according to the second embodiment may not include the second circulator 15.

In the apparatus for producing an acidic aqueous solution 101 according to the second embodiment described above, in addition to the effects of the apparatus for producing an acidic aqueous solution 100 according to the first embodiment described above, a sodium hypochlorite aqueous solution used as a disinfectant for treated water can be produced on-site in the sodium hypochlorite producing device 130. In addition, when the produced sodium hypochlorite aqueous solution is added to the treated water, the sodium hypochlorite aqueous solution can be used as a disinfectant.

<Apparatus for Producing Acidic Aqueous Solution According to Third Embodiment>

An apparatus for producing an acidic aqueous solution according to a third embodiment further includes a hydrogen peroxide producing device in addition to the apparatus for producing an acidic aqueous solution according to the first embodiment. That is, the apparatus for producing an acidic aqueous solution according to the second embodiment includes an electrodialyzer, an electrolyzer, a first circulator, and a hydrogen peroxide producing device.

The apparatus for producing an acidic aqueous solution according to the third embodiment will be described in detail with reference to FIG. 7.

Figure 7:
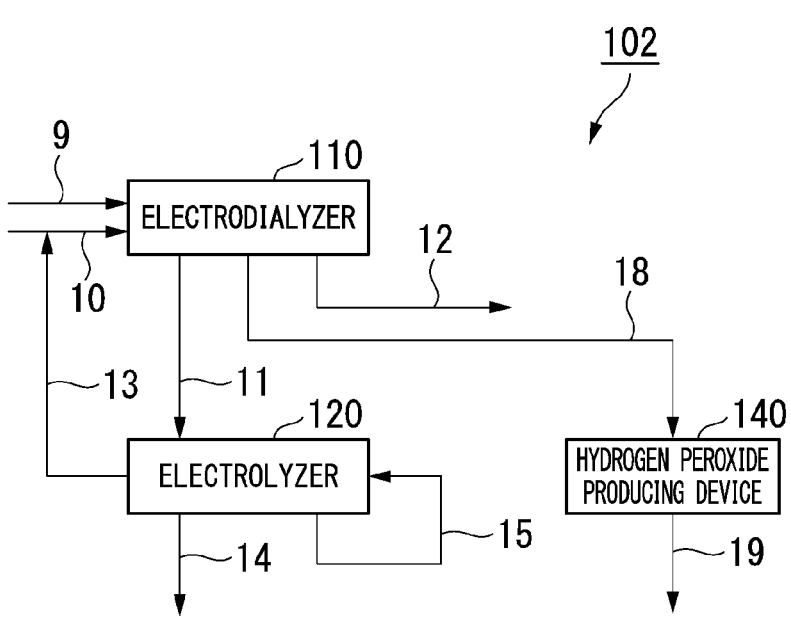
FIG. 7 is a schematic view of an apparatus for producing an acidic aqueous solution 102 according to a third embodiment.

An apparatus for producing an acidic aqueous solution 102 according to the third embodiment shown in FIG. 7 has the following configuration.

The wastewater inflow pipe 10 through which wastewater is supplied is connected to the electrodialysis dilution chamber of the electrodialyzer 110. In addition, the dialysis water electrodialysis concentration chamber supply pipe 9 through which dialysis water is supplied is connected to the electrodialysis concentration chamber of the electrodialyzer 110. The first electrodialysis concentrated water supply pipe 11, the electrodialysis diluted water discharge pipe 12, and a third electrodialysis concentrated water supply pipe 18 are connected to the outlet side of the electrodialyzer 110. The electrodialyzer 110 is connected to the electrolyzer 120 via the electrodialysis concentrated water supply pipe 11. The first circulator 13, the acid water discharge pipe 14, and the second circulator 15 are connected to the outlet side of the electrolyzer 120. In addition, the electrodialyzer 110 is connected to a hydrogen peroxide producing device 140 via the third electrodialysis concentrated water supply pipe 18. A hydrogen peroxide discharge pipe 19 is connected to the outlet side of the hydrogen peroxide producing device 140.

The hydrogen peroxide producing device 140 is an apparatus that electrolyzes a part of the electrodialysis concentrated water to produce hydrogen peroxide.

Figure 8:
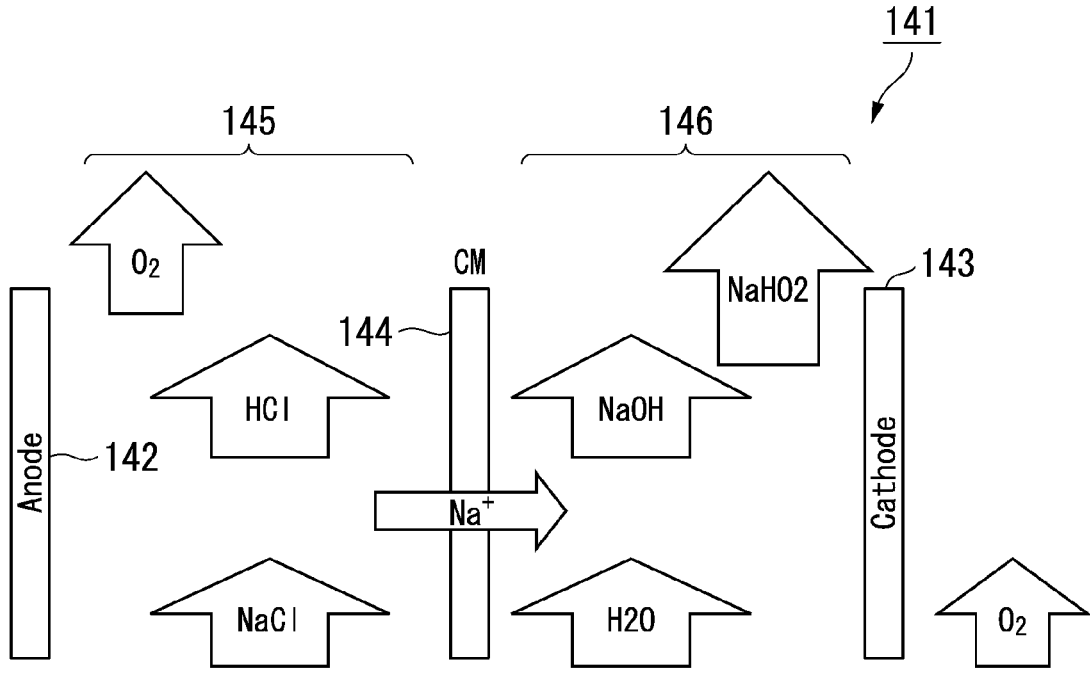
FIG. 8 is a schematic view showing a hydrogen peroxide producing device 141, which is an example of a hydrogen peroxide producing device.

As the hydrogen peroxide producing device 140, for example, a two-chamber electrolyzer 141 having a gas diffusion electrode shown in in FIG. 8 may be exemplified.

The two-chamber electrolyzer 141 having a gas diffusion electrode includes an anode 142 and a cathode 143, and is divided into an anode chamber 145 and a cathode chamber 146 by a diaphragm 144.

As the anode 142, specifically, the same ones described above as the anode 112 of the electrodialyzer 110 may be exemplified.

As the cathode 143, specifically, it is preferable to use a porous oxygen gas diffusion electrode having excellent mass transfer of oxygen gas, which is a raw material.

As a porous oxygen gas diffusion electrode, more specifically, an oxygen gas diffusion electrode in which a graphite powder having a particle size of about several tens of μm is used as a catalyst, and a sheet mixed with a fluororesin solution is fixed to a conductive support having excellent air permeability such as a carbon cloth or carbon paper with a hot press is preferable.

The inter-electrode distance between the anode 142 and the cathode 143 in the hydrogen peroxide producing device 140 is preferably 0.2 to 5 mm.

As the diaphragm 144, the same ones described above as the diaphragm 124 in the two-chamber electrolyzer 121 may be exemplified.

When electrolysis is performed while supplying an oxygen-containing gas from behind the gas diffusion electrode in which a cathode catalyst is formed described above, hydrogen peroxide (ion) is produced by a reaction represented by the following Formula (5).

$$O_2 + H_2O + 2e^- = HO_2^- + OH^- \qquad (5)$$

When the hydrogen peroxide is used in combination in, for example, in the ultraviolet (UV) treatment process in the final stage of drinking water production, an advanced oxidation process (AOP) proceeds, and contributes to improvement of water quality. In addition, if wastewater is treated with ozone, when an oxidation treatment with ozone becomes excessive, for example, hydrogen peroxide can also be used for decomposition of bromic acid, which is generally produced by oxidation of bromide ions contained in the wastewater.

In addition, when a disinfection treatment with a sodium hypochlorite aqueous solution is performed, hydrogen peroxide can also be used when excess sodium hypochlorite is removed.

When the hydrogen peroxide discharge pipe 19 is connected to the apparatus that performs the above treatment or a discharge pipe for the treated water that is treated by the apparatus, the hydrogen peroxide produced by the hydrogen peroxide producing device 140 described above can be used.

Here, the apparatus for producing an acidic aqueous solution 102 according to the third embodiment includes the dialysis water electrodialysis concentration chamber supply pipe 9. However, depending on the water quality of wastewater, the dialysis water electrodialysis concentration chamber supply pipe 9 may not be provided, and only the wastewater inflow pipe 10 may be connected to the electrodialyzer 110.

That is, wastewater may be supplied to both the electrodialysis concentration chamber and the electrodialysis dilution chamber of the electrodialyzer 110.

In addition, the apparatus for producing an acidic aqueous solution 102 according to the third embodiment includes the second circulator 15 that circulates the acidic aqueous solution (for example, hydrochloric acid) produced in the electrolyzer 120 in order to wash the inside of the electrolyzer 120. However, the apparatus for producing an acidic aqueous solution 102 according to the third embodiment may not include the second circulator 15.

In the apparatus for producing an acidic aqueous solution 102 according to the third embodiment described above, in addition to the effects of the apparatus for producing an acidic aqueous solution 100 according to the first embodiment described above, hydrogen peroxide that is generally used in the wastewater treatment process can be produced on-site in the hydrogen peroxide producing device 140. In addition, when the produced hydrogen peroxide is added to treated water, the hydrogen peroxide can be used.

<Apparatus for Producing Acidic Aqueous Solution According to Fourth Embodiment>

An apparatus for producing an acidic aqueous solution according to a fourth embodiment further includes a sodium hypochlorite producing device and a hydrogen peroxide producing device in addition to the apparatus for producing an acidic aqueous solution according to the first embodiment. That is, the apparatus for producing an acidic aqueous solution according to the fourth embodiment includes an electrodialyzer, an electrolyzer, a first circulator, a sodium hypochlorite producing device, and a hydrogen peroxide producing device.

The apparatus for producing an acidic aqueous solution according to the fourth embodiment will be described in detail with reference to FIG. 9.

Figure 9:
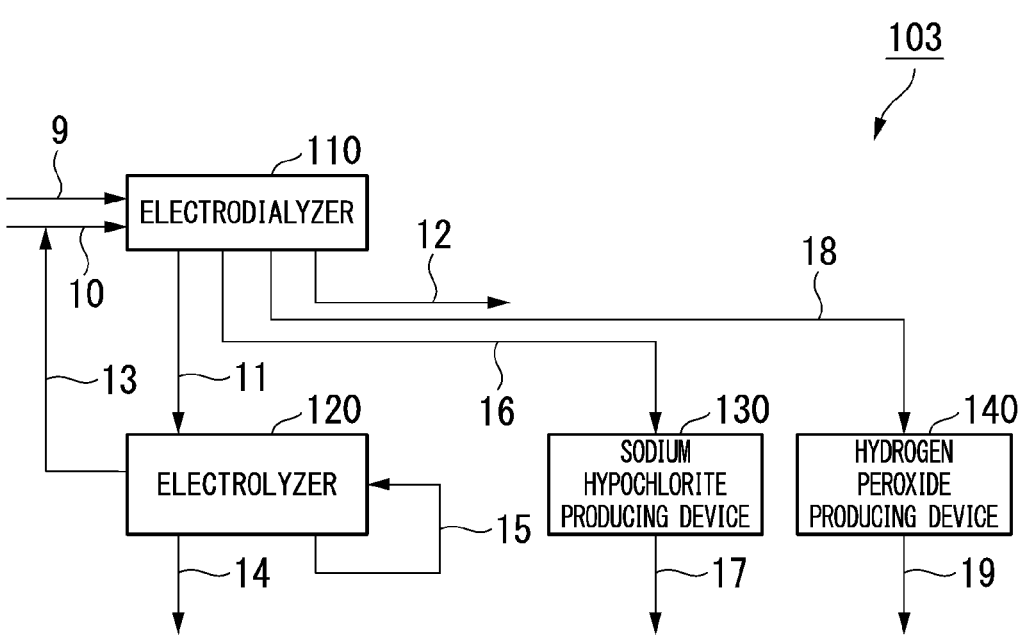
FIG. 9 is a schematic view of an apparatus for producing an acidic aqueous solution 103 according to a fourth embodiment.

An apparatus for producing an acidic aqueous solution 103 according to the fourth embodiment shown in FIG. 9 has the following configuration.

The wastewater inflow pipe 10 through which wastewater is supplied is connected to the electrodialysis dilution chamber of the electrodialyzer 110. In addition, the dialysis water electrodialysis concentration chamber supply pipe 9 through which dialysis water is supplied is connected to the electrodialysis concentration chamber of the electrodialyzer 110. The first electrodialysis concentrated water supply pipe 11, the electrodialysis diluted water discharge pipe 12, the second electrodialysis concentrated water supply pipe 16 and the third electrodialysis concentrated water supply pipe 18 are connected to the outlet side of the electrodialyzer 110. The electrodialyzer 110 is connected to the electrolyzer 120 via the electrodialysis concentrated water supply pipe 11. The first circulator 13, the acid water discharge pipe 14, and the second circulator 15 are connected to the outlet side of the electrolyzer 120. In addition, the electrodialyzer 110 is connected to the sodium hypochlorite producing device 130 via the second electrodialysis concentrated water supply pipe 16. The sodium hypochlorite aqueous solution discharge pipe 17 is connected to the outlet side of the sodium hypochlorite producing device 130. In addition, the electrodialyzer 110 is connected to the hydrogen peroxide producing device 140 via the third electrodialysis concentrated water supply pipe 18. The hydrogen peroxide discharge pipe 19 is connected to the outlet side of the hydrogen peroxide producing device 140.

Here, the apparatus for producing an acidic aqueous solution 103 according to the fourth embodiment includes the dialysis water electrodialysis concentration chamber supply pipe 9. However, depending on the water quality of wastewater, the dialysis water electrodialysis concentration chamber supply pipe 9 may not be provided, and only the wastewater inflow pipe 10 may be connected to the electrodialyzer 110.

That is, wastewater may be supplied to both the electrodialysis concentration chamber and the electrodialysis dilution chamber of the electrodialyzer 110.

In addition, the apparatus for producing an acidic aqueous solution 103 according to the fourth embodiment includes the second circulator 15 that circulates the acidic aqueous solution (for example, hydrochloric acid) produced in the electrolyzer 120 in order to wash the inside of the electrolyzer 120. However, the apparatus for producing an acidic aqueous solution 103 according to the fourth embodiment may not include the second circulator 15.

In the apparatus for producing an acidic aqueous solution 103 according to the fourth embodiment described above, in addition to the effects of the apparatus for producing an acidic aqueous solution 100 according to the first embodiment described above, a sodium hypochlorite aqueous solution used as a disinfectant for treated water and hydrogen peroxide that is generally used in the wastewater treatment process can be produced on-site. In addition, the produced sodium hypochlorite aqueous solution and hydrogen peroxide can be used on-site.

(Method for Producing Acidic Aqueous Solution)

A second embodiment of the present invention is a method for producing an acidic aqueous solution in which an acidic aqueous solution is produced from wastewater containing chloride ions and alkali metal ions, including an electrodialysis process in which the wastewater is separated into electrodialysis concentrated water and electrodialysis diluted water by an electrodialysis treatment, an electrolysis process in which the electrodialysis concentrated water is electrolyzed to produce an acidic aqueous solution, and a first circulating process in which at least some of the acidic aqueous solution is circulated to the wastewater supplied to the electrodialysis process.

<Method for Producing Acidic Aqueous Solution According to First Embodiment>

A method for producing an acidic aqueous solution according to a first embodiment includes an electrodialysis process 210, an electrolysis process 220, and a first circulating process.

Figure 10:
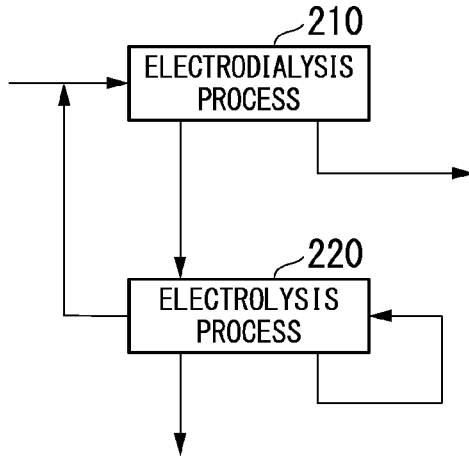
FIG. 10 is a schematic view of a method for producing an acidic aqueous solution according to the first embodiment.

The schematic view of the method for producing an acidic aqueous solution according to the first embodiment is as shown in FIG. 10.

[Electrodialysis Process]

The electrodialysis process 210 is a process of separating wastewater containing chloride ions and alkali metal ions into electrodialysis concentrated water and electrodialysis diluted water by an electrodialysis treatment.

Specifically, a large number of electrodialysis membranes as in the above electrodialyzer (FIG. 2) are arranged, wastewater is supplied to an electrodialyzer including an electrodialysis concentration chamber and an electrodialysis dilution chamber alternately formed, a current is caused to flow, and thus electrodialysis concentrated water containing various ion components at a high concentration can be obtained in the concentration chamber, and electrodialysis diluted water containing various ion components at a low concentration can be obtained in the dilution chamber.

In electrodialysis conditions, the temperature is preferably 25 to 60° C., and the current density is preferably 1 to 10 A/dm$^2$.

When the method for producing an acidic aqueous solution according to the first embodiment includes the electrodialysis process 210, since the concentration of chloride ions in wastewater can increase, in the electrolysis process to be described below, the acidic aqueous solution can be produced more efficiently. In addition, multivalent ions that are likely to adhere to the electrolyzer used in the electrolysis process can be removed in advance.

[Electrolysis Process]

The electrolysis process 220 is a process in which a part of wastewater is electrolyzed to obtain an acidic aqueous solution and an alkaline aqueous solution.

Specifically, in this method, by applying a voltage to a pair of electrodes having electron conductivity (that is, a positive electrode; an anode, and a negative electrode; a cathode) and an electrolyte having ion conductivity, an oxidation reaction occurs in the anode, and a reduction reaction occurs in the cathode, and an acidic aqueous solution and an alkaline aqueous solution are obtained.

The electrolysis process 220 can be performed using, for example, the above two-chamber electrolyzer (refer to FIG. 3) and three-chamber electrolyzer (refer to FIG. 4).

In the electrolysis process 220, for example, when wastewater containing sodium ions and chloride ions is electrolyzed, a reaction represented by the following Formula (6) proceeds, and a sodium hydroxide aqueous solution (that is, an alkaline aqueous solution) and a hydrochloric acid (that is, an acidic aqueous solution) are obtained.

$$NaCl+2H_2O=NaOH+HCl+H_2+\tfrac{1}{2}O_2 \qquad (6)$$

For example, in the two-chamber electrolyzer (FIG. 3) to be described below, a mixture of hydrochloric acid and salt water is obtained as the acidic aqueous solution, and a mixture of sodium hydroxide and salt water is obtained as the alkaline aqueous solution.

On the other hand, in the three-chamber electrolyzer (FIG. 4) to be described below, the sodium hydroxide aqueous solution is obtained in the cathode chamber, and hydrochloric acid is obtained in the anode chamber.

The hydrochloric acid obtained in the reaction is mixed with wastewater supplied to the electrodialysis process 210 described above, and used to adjust the pH.

In addition, when the electrolyzer in which the anode is a hydrogen gas diffusion electrode is used, a hydrogen oxidation reaction represented by the following Formula (7) occurs in the anode. In addition, the total reaction is as shown in the following Formula (8).

$$H_2=2H^++2e^- \tag{7}$$

$$NaCl+H_2O=NaOH+HCl \tag{8}$$

As the raw hydrogen gas, a high-purity electrolytic hydrogen gas generated in the cathode is used. It is possible to minimize generation of chlorine by keeping a potential lower than a chlorine generation potential.

In the electrolysis process 220, according to the above hydrogen oxidation reaction, an acidic aqueous solution and an alkaline aqueous solution can be produced, and thus it is possible to further minimize generation of chlorine.

[First Circulating Process]

The first circulating process is a process in which at least some of the acidic aqueous solution produced in the electrolysis process 220 is circulated to the wastewater supplied in the electrodialysis process.

The pH of the wastewater supplied in the electrodialysis process is adjusted with the acidic aqueous solution obtained in the electrolysis process 220.

For example, the wastewater supplied to the electrodialysis process 210 describe above may be treated in advance by a crystallizer that removes calcium carbonate or an alkaline precipitation device that precipitates and removes heavy metals as hydroxides. In this case, since the wastewater is alkaline (a pH of about 11 or more), it is preferable to circulate the acidic aqueous solution produced in the electrolysis process to the wastewater to adjust the pH of the wastewater. Specifically, it is preferable to adjust the pH of the wastewater to 10 or less, and it is more preferable to adjust the pH of the wastewater to 3 to 9.

Thereby, it is possible to further prevent deterioration of the monovalent anion perm-selective ion-exchange membrane and the monovalent cation perm-selective ion-exchange membrane of the electrodialyzer used in the electrodialysis process.

[Washing Process]

The method for producing an acidic aqueous solution according to the first embodiment may include a washing process. The washing process is a process in which the apparatus (that is, the electrolyzer) used in the electrolysis process 220 described above is washed using at least some of the acidic aqueous solution. Due to continuous operations of the electrolyzer for a long time, hardness components are precipitated on the diaphragm and the cathode in the apparatus of the electrolyzer, which causes deterioration of performance of the electrolyzer. Therefore, it is preferable to intermittently stop the electrolyzer and wash with the acidic aqueous solution obtained in the electrolysis process 220. The frequency of washing depends on the water quality and operation conditions, and washing is preferably performed every several hours to several tens of hours and several tens of minutes to several hours.

The method for producing an acidic aqueous solution according to the first embodiment described above includes the above electrodialysis process, the electrolysis process 220, and a first circulating process. An acidic aqueous solution required for adjusting the pH of the wastewater and preventing deterioration of the monovalent ion perm-selective ion-exchange membrane used in the electrodialysis process can be produced on-site in the electrolysis process 220, and used in the electrodialysis process according to the first circulating process. Therefore, it is not necessary to transport and store the acidic aqueous solution from the outside and it is possible to significantly reduce the economic burden.

<Method for Producing Acidic Aqueous Solution According to Second Embodiment>

A method for producing an acidic aqueous solution according to a second embodiment includes an electrodialysis process 210, an electrolysis process 220, a first circulating process, and a sodium hypochlorite producing process 230.

Figure 11:
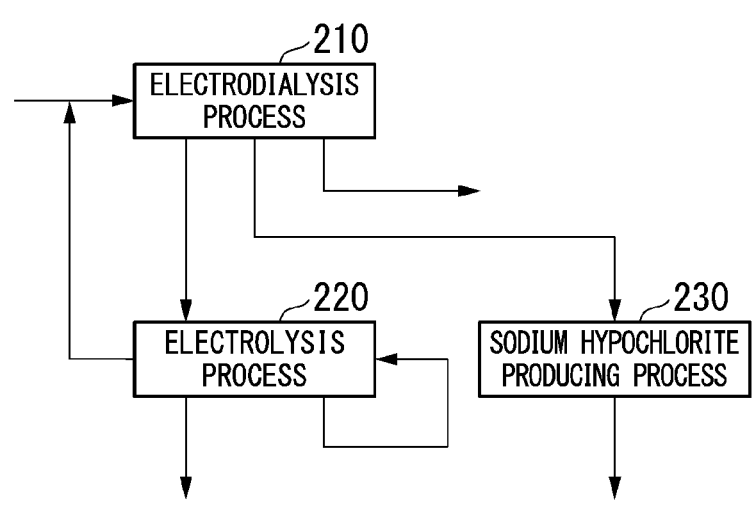
FIG. 11 is a schematic view of a method for producing an acidic aqueous solution according to the second embodiment.

The schematic view of the method for producing an acidic aqueous solution according to the second embodiment is as shown in FIG. 11.

[Sodium Hypochlorite Producing Process]

The sodium hypochlorite producing process 230 is a process of electrolyzing a part of electrodialysis concentrated water to produce a sodium hypochlorite aqueous solution.

When an anode catalyst is appropriately selected, the reaction as shown in the following Formula (4) occurs, and sodium hypochlorite can be produced from chloride ions contained in wastewater.

$$2Cl^-=Cl_2+2e^-$$

$$2NaOH+Cl_2 \rightarrow NaCl+NaClO+H_2O \tag{4}$$

The sodium hypochlorite can be used as a disinfectant for treated water.

Therefore, in the method for producing an acidic aqueous solution according to the second embodiment, in addition to the effects of the method for producing an acidic aqueous solution according to the first embodiment described above, when a sodium hypochlorite aqueous solution used as a disinfectant for treated water is produced on-site in the sodium hypochlorite producing process, and added to the treated water, the sodium hypochlorite aqueous solution can be used as a disinfectant.

The hypochlorous acid component is stably present as hypochlorous acid ions in the alkaline region and hypochlorous acid in the acidic region, and either can be produced by changing the pH of the solution to be electrolyzed. It is known that sterilizing power is higher in the latter case. Sodium hypochlorite in one embodiment of the present invention is a general term for these.

<Method for Producing Acidic Aqueous Solution According to Third Embodiment>

A method for producing an acidic aqueous solution according to a third embodiment includes an electrodialysis process 210, an electrolysis process 220, a first circulating process, and a hydrogen peroxide producing process 240.

Figure 12:
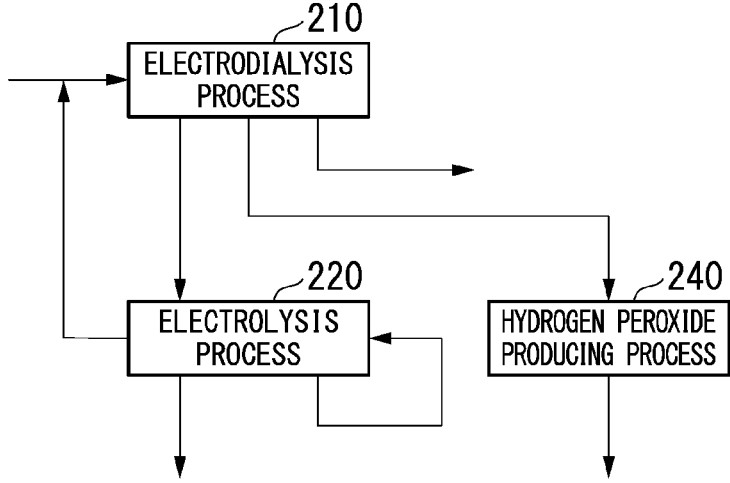
FIG. 12 is a schematic view of a method for producing an acidic aqueous solution according to the third embodiment.

The schematic view of the method for producing an acidic aqueous solution according to the third embodiment is as shown in FIG. 12.

[Hydrogen Peroxide Producing Process]

The hydrogen peroxide producing process 240 is a process of electrolyzing a part of electrodialysis concentrated water to produce hydrogen peroxide.

The hydrogen peroxide producing process can be performed using, for example, the above hydrogen peroxide producing device.

When the hydrogen peroxide is used in combination in, for example, in the UV treatment process in the final stage of drinking water production, an advanced oxidation process (AOP) proceeds, and contributes to improvement of water quality. In addition, if wastewater is treated with ozone, when an oxidation treatment with ozone becomes excessive, for example, hydrogen peroxide can also be used for decomposition of bromic acid produced by oxidation of bromide ions contained in the wastewater.

In addition, when a disinfection treatment with a sodium hypochlorite aqueous solution is performed, hydrogen peroxide can also be used when excess sodium hypochlorite is removed.

In the method for producing an acidic aqueous solution according to the third embodiment described above, in addition to the effects of the method for producing an acidic aqueous solution according to the first embodiment described above, hydrogen peroxide that is generally used in the wastewater treatment process can be produced on-site in the hydrogen peroxide producing device. In addition, when the produced hydrogen peroxide is added to treated water, the hydrogen peroxide can be used.

<Method for Producing Acidic Aqueous Solution According to Fourth Embodiment>

A method for producing an acidic aqueous solution according to a fourth embodiment includes an electrodialysis process 210, an electrolysis process 220, a first circulating process, a sodium hypochlorite producing process 230, and a hydrogen peroxide producing process 240.

Figure 13:
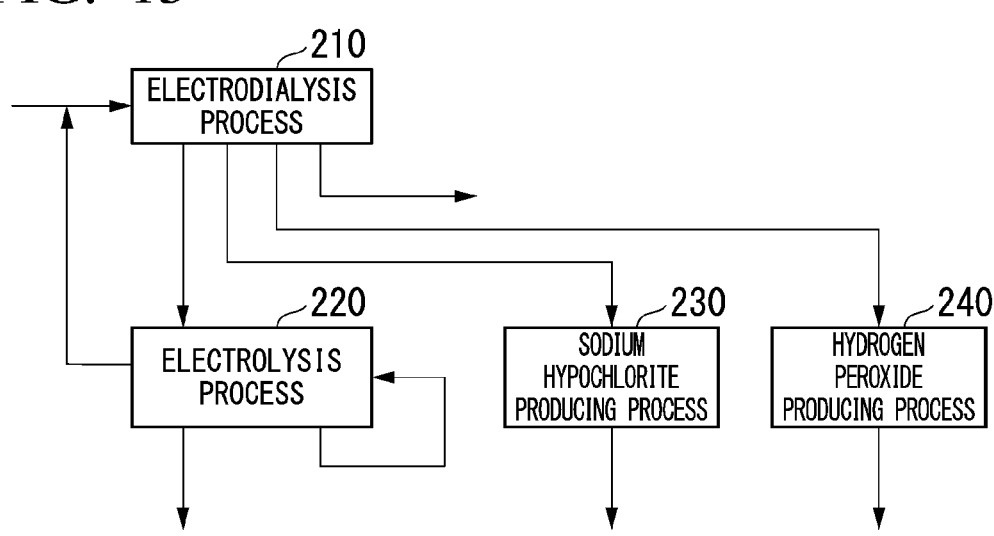
FIG. 13 is a schematic view of a method for producing an acidic aqueous solution according to the fourth embodiment.

The schematic view of the method for producing an acidic aqueous solution according to the fourth embodiment is as shown in FIG. 13.

In the method for producing an acidic aqueous solution according to the fourth embodiment, in addition to the effects of the method for producing an acidic aqueous solution according to the first embodiment described above, a sodium hypochlorite aqueous solution used as a disinfectant for treated water and hydrogen peroxide that is generally used in the wastewater treatment process can be produced on-site. In addition, the produced sodium hypochlorite aqueous solution and hydrogen peroxide can be used on-site.

EXAMPLES

While the present invention will be described below in more detail with reference to examples, the present invention is not limited to these examples.

Water to be Treated

As water to be treated, acidic aqueous solutions of examples were produced using test water (referred to as simulated wastewater) containing various ion components (sodium ions, calcium ions, magnesium ions, chloride ions, bicarbonate ions, and silica) shown in Table 1.

Example 1

An acidic aqueous solution was produced using the apparatus for producing an acidic aqueous solution including an electrodialyzer and an electrolyzer shown in FIG. 1.

[Electrodialysis Process]

In a small electrodialysis cell (S3 commercially available from ASTOM Corporation, 10 concentration chamber sections, an electrode area of 55 $cm^2$) into which a monovalent ion perm-selective ion-exchange membrane was incorporated, the dilution chamber of the electrodialysis cell was filled with 8 L test water (of which the pH was adjusted to 6.6 using hydrochloric acid obtained in the electrolysis process to be described below), the concentration chamber of the electrodialysis cell was filled with 0.5 L tap water, the flow rate of each chamber was fixed at 5 mL/min, and a voltage of 10 V was applied to perform an electrodialysis process.

As a result, the electrodialysis concentrated water and the electrodialysis diluted water shown in Table 1 were obtained. Here, the current value was about 0.25 A.

[Electrolysis Process]

As the electrolyzer, a two-chamber electrolysis cell (the electrolysis area was 10 $cm^2$) including a Ti mesh formed with a catalyst composed of Pt and Ir oxide as a positive electrode (that is, the anode), a Ni mesh as a negative electrode (that is, the cathode), and Y9201 (diaphragm: commercially available from Yuasa Membrane Systems Co., Ltd.) as a diaphragm and having a diaphragm with an inter-electrode distance of 2 mm was used.

The electrodialysis concentrated water was supplied to the anode chamber of the two-chamber electrolysis cell at a flow rate of 5 mL/min, and the electrodialysis concentrated water was supplied to the cathode chamber of the two-chamber electrolysis cell at a flow rate of 2.5 mL/min. Electrolysis was performed at a current density of 5 A/$dm^2$. The cell voltage was 6 V.

As a result, in the anode chamber of the two-chamber electrolysis cell, a 0.7 g/L hydrochloric acid shown as an acidic aqueous solution in Table 1 was obtained (pH 1.7). In addition, in the cathode chamber of the two-chamber electrolysis cell, a 4 g/L sodium hydroxide aqueous solution and a 2.5 g/L sodium carbonate aqueous solution shown as an alkaline aqueous solution in Table 1 were obtained (pH 12.8).

[Method for Measuring pH of Raw Water and Various Treated Waters]

The pH of the raw water and various treated waters shown in Table 1 was a value of the pH measured at 25° C. with a pH meter (D74, commercially available from HORIBA, Ltd.).

[Method for Measuring Content of Various Ion Components]

In the analysis method of the concentration of various ion components of raw water and various treated waters shown in Table 1 (that is, electrodialysis concentrated water, electrodialysis diluted water, an acidic aqueous solution, and an alkaline aqueous solution), the concentration of cations was a value measured using an emission spectrophotometer (ICP-AES; SPS5520, commercially available from Seiko Instruments Inc.) using an argon gas ICP as a light source.

On the other hand, the concentration of anions was measured using an ion chromatography analyzer (ICA-2000; commercially available from DKK-TOA Corporation).

[Method for Measuring Amount of Hydrochloric Acid, Sodium Hydroxide Aqueous Solution, and Sodium Carbonate Aqueous Solution Produced]

Hydrochloric acid was quantified with a sodium hydroxide aqueous solution with a known concentration. The sodium hydroxide aqueous solution and the sodium carbonate aqueous solution were quantified by two-step titration with hydrochloric acid with a known concentration.

TABLE 1

| | Concentration | Na$^+$ | Ca$^{2+}$ | Mg$^{2+}$ | Cl$^-$ | HCO$_3^-$ | SiO$_2$ | pH |
|---|---|---|---|---|---|---|---|---|
| Test water | [mg/L] | 500 | 200 | 70 | 370 | 400 | 100 | 8 |
| Electrodialysis concentrated water | [mg/L] | 3,600 | 220 | 1 | 3,300 | 2,300 | 100 | 6.6 |
| Electrodialysis diluted water | [mg/L] | 280 | 190 | 70 | 160 | 290 | 100 | 6.6. |
| Acidic aqueous solution | [mg/L] | 2,500 | 100 | 1 | 1,050 | 0 | 90 | 1.7 |
| Alkaline aqueous solution | [mg/L] | 5,900 | 350 | 2 | 3,300 | 2,300 | 100 | 12.8 |

Example 2

An acidic aqueous solution was produced in the same method as in Example 1 except that, as the positive electrode (that is, the anode) of the electrolyzer (also referred to as a two-chamber electrolysis cell), a hydrogen gas diffusion electrode in which a catalyst layer in which a Pt/C powder catalyst and a fluororesin solution were mixed was fixed on carbon paper at an amount of 1 mg/cm$^2$ with a hot press was used, and 1.2 times more hydrogen gas than a theoretical mixing amount for performing the electrolysis reaction was supplied to the gas chamber formed on the back side of the anode. The obtained amount of the hydrochloric acid and sodium hydroxide produced was about the same as in Example 1, but no free chlorine was produced.

Example 3

An acidic aqueous solution was produced using the apparatus for producing an acidic aqueous solution including an electrodialyzer, an electrolyzer, and a hydrogen peroxide producing device shown in FIG. 7.

The electrodialyzer and the electrodialysis process, and the electrolyzer and the electrolysis process were the same as in Example 1, a 0.7 g/L hydrochloric acid was obtained in the anode chamber of the two-chamber electrolysis cell (pH 1.7). In addition, in the cathode chamber of the two-chamber electrolysis cell, 4 g/L sodium hydroxide, and 2.5 g/L sodium carbonate were obtained (pH 12.8).

[Hydrogen Peroxide Producing Process]

As the hydrogen peroxide producing device, a two-chamber electrolysis cell (the electrolysis area was 10 cm$^2$) including a Ti mesh formed with a catalyst composed of Pt and Ir oxide as a positive electrode (that is, the anode), an oxygen gas diffusion electrode in which a catalyst layer in which a graphite powder catalyst and a fluororesin solution were mixed was fixed on carbon paper at an amount of 10 mg/cm$^2$ with a hot press as a negative electrode (that is, the cathode), and Y9201 (diaphragm: commercially available from Yuasa Membrane Systems Co., Ltd.) as a diaphragm, and having a diaphragm with an inter-electrode distance of 2 mm was used.

The electrodialysis concentrated water was supplied to the anode chamber of the two-chamber electrolysis cell at a flow rate of 5 mL/min, and the electrodialysis concentrated water was supplied to the cathode chamber of the two-chamber electrolysis cell at a flow rate of 2.5 mL/min. Electrolysis was performed at a current density of 5 A/dm$^2$. The cell voltage was 5.5 V.

As a result, 1.1 g/L hydrogen peroxide (as H$_2$O$_2$) was obtained.

[Method for Measuring Amount of Hydrogen Peroxide Produced]

When titanium sulfate was added to the hydrogen peroxide aqueous solution, a complex compound of hydrogen peroxide and titanium was formed, and the UV absorption spectrum of the complex compound was measured as the absorbance using UV-2550 (commercially available from Shimadzu Corporation), and thus the amount of hydrogen peroxide produced was obtained.

Here, the methods for measuring the pH and the amount of the acidic aqueous solution and the alkaline aqueous solution produced were the same as the measurement methods of Example 1 described above.

Comparative Example 1

An acidic aqueous solution was produced in the same method as in Example 1 except that a small electrodialysis cell (S3 commercially available from ASTOM Corporation, 10 concentration chamber sections, an electrode area of 55 cm$^2$) into which a known ion-exchange membrane having no monovalent ion perm-selectivity was incorporated in place of the monovalent ion perm-selective ion-exchange membrane was used.

As a result, the cell voltage sharply increased, and electrolysis could not be continued.

In Examples 1 and 2, it was confirmed that the acidic aqueous solution for adjusting the pH of the wastewater supplied to the electrodialyzer could be produced on-site from the wastewater in the electrolyzer.

In addition, in Example 3, it was confirmed that, in addition to the acidic aqueous solution, hydrogen peroxide could be produced on-site from the wastewater.

On the other hand, it was confirmed that, when the electrodialyzer including an ion-exchange membrane having no monovalent ion perm-selectivity of Comparative Example 1 was used, a large amount of calcium and magnesium components were precipitated on the cathode and the ion-exchange membrane having no monovalent ion perm-selectivity, and the acidic aqueous solution could not be continuously obtained.

Thereby, it was confirmed that, according to the apparatus for producing an acidic aqueous solution and the method for producing an acidic aqueous solution using these apparatuses according to the first to fourth embodiments, the acidic aqueous solution used in the wastewater treatment process could be produced and used on-site, and economic burden could be significantly reduced.

REFERENCE SIGNS LIST

100, 101, 102, 103 Apparatus for producing acidic aqueous solution 110, 111 Electrodialyzer
120 Electrolyzer
13 First circulator
121 Two-chamber electrolyzer
125 Three-chamber electrolyzer
130, 131 Sodium hypochlorite producing device
140, 141 Hydrogen peroxide producing device
210 Electrodialysis process
220 Electrolysis process
230 Sodium hypochlorite producing process
240 Hydrogen peroxide producing process

The invention claimed is:

1. An apparatus for producing an acidic aqueous solution, the apparatus comprising:
   an electrodialyzer that has a cation-exchange membrane and an anion-exchange membrane, and separates wastewater containing chloride ions and alkali metal ions into electrodialysis concentrated water and electrodialysis diluted water by an electrodialysis treatment;
   an electrolyzer that electrolyzes the electrodialysis concentrated water to produce an acidic aqueous solution;
   a first circulator that circulates at least some of the acidic aqueous solution to the wastewater supplied to the electrodialyzer; and
   a second circulator that circulates at least some of the acidic aqueous solution to the electrolyzer,
   wherein the cation-exchange membrane is a m-phenol-sulfonic acid-phenolic resin, or a resin obtained by subjecting a styrene-divinylbenzene copolymer to a sulfonation reaction,
   wherein a cationic polymer electrolyte containing a poly-ethyleneimine is formed on a surface of the cation-exchange membrane, and
   wherein the anion-exchange membrane is an m-phenylenediamine-phenolic condensed resin, or a resin obtained by subjecting a styrene-divinylbenzene copolymer to an amination reaction.

2. The apparatus for producing an acidic aqueous solution according to claim 1, wherein, in the electrolyzer, the anode is a hydrogen gas diffusion electrode.

3. The apparatus for producing an acidic aqueous solution according to claim 1, further comprising a sodium hypochlorite producing device that electrolyzes a part of the electrodialysis concentrated water to produce a sodium hypochlorite aqueous solution.

4. The apparatus for producing an acidic aqueous solution according to claim 3, wherein a discharge pipe for the sodium hypochlorite aqueous solution produced by the sodium hypochlorite producing device is connected to a discharge pipe for the wastewater.

5. The apparatus for producing an acidic aqueous solution according to claim 1, further comprising a hydrogen peroxide producing device that electrolyzes a part of the electrodialysis concentrated water to produce hydrogen peroxide.

6. The apparatus for producing an acidic aqueous solution according to claim 5, wherein a discharge pipe for the hydrogen peroxide produced by the hydrogen peroxide producing device is connected to a discharge pipe for the wastewater.

7. The apparatus for producing an acidic aqueous solution according to claim 1, wherein the anode includes a conductive metal substrate and a catalyst layer.

8. The apparatus for producing an acidic aqueous solution according to claim 7, wherein the thickness of the conductive metal substrate is 0.05 to 5 mm.

9. The apparatus for producing an acidic aqueous solution according to claim 7, wherein the thickness of the catalyst layer is 0.1 to 100 um.

10. The apparatus for producing an acidic aqueous solution according to claim 7, wherein the porosity of the anode is 10 to 95%.

11. The apparatus for producing an acidic aqueous solution according to claim 7, wherein the anode further includes an underlayer made of a valve metal base alloy containing tantalum and titanium components between the conductive metal substrate and the catalyst layer.

12. The apparatus for producing an acidic aqueous solution according to claim 1, wherein, in the electrolyzer, a cathode is an oxygen gas diffusion electrode.

13. The apparatus for producing an acidic aqueous solution according to claim 1, wherein
   the electrolyzer comprises an anode that electrolyzes the electrodialysis concentrated water to produce the acidic aqueous solution, and
   the first circulator adjusts a pH of the wastewater supplied to the electrodialyzer to 3 to 9 when the wastewater is alkaline.

14. A method for producing an acidic aqueous solution to produce the acidic aqueous solution from wastewater containing chloride ions and alkali metal ions, comprising:
   an electrodialysis process in which the wastewater is separated, by using an electrodialyzer including a cation-exchange membrane and an anion-exchange membrane, into electrodialysis concentrated water and electrodialysis diluted water by an electrodialysis treatment;
   an electrolysis process in which the electrodialysis concentrated water is electrolyzed to produce an acidic aqueous solution;
   a first circulating process in which at least some of the acidic aqueous solution is circulated to the wastewater supplied in the electrodialysis process; and
   a second circulating process in which at least some of the acidic aqueous solution is used in the electrolysis process,
   wherein the cation-exchange membrane is a m-phenol-sulfonic acid-phenolic resin or a resin obtained by subjecting a styrene-divinylbenzene copolymer to a sulfonation reaction, and
   wherein a cationic polymer electrolyte containing a poly-ethyleneimine is formed on a surface of the cation-exchange membrane, and
   the anion-exchange membrane is an m-phenylenediamine-phenolic condensed resin, or a resin obtained by subjecting a styrene-divinylbenzene copolymer to an amination reaction.

15. The method for producing an acidic aqueous solution according to claim 14, wherein the electrolysis process is performed by a hydrogen oxidation reaction.

16. The method for producing an acidic aqueous solution according to claim 14, further comprising
   a sodium hypochlorite producing process in which a part of the electrodialysis concentrated water is electrolyzed to produce a sodium hypochlorite aqueous solution.

17. The method for producing an acidic aqueous solution according to claim 14, further comprising
   hydrogen peroxide producing process in which a part of the electrodialysis concentrated water is electrolyzed to produce hydrogen peroxide.

18. The method for producing an acidic aqueous solution according to claim 14, wherein in the electrolysis process, the electrodialysis concentrated water is electrolyzed to produce, by an anode comprised in an electrolyzer, the acidic aqueous solution, and in the first circulating process, a pH of the wastewater supplied to the electrodialysis process is adjusted to 3 to 9 when the wastewater is alkaline.

* * * * *